US008326115B2

(12) United States Patent  
Murakoshi et al.

(10) Patent No.: US 8,326,115 B2  
(45) Date of Patent: Dec. 4, 2012

(54) INFORMATION PROCESSING APPARATUS, DISPLAY METHOD THEREOF, AND PROGRAM THEREOF

(75) Inventors: Sho Murakoshi, Tokyo (JP); Tsutomu Seki, Chiba (JP); Noboru Murabayashi, Saitama (JP)

(73) Assignee: Sony Corporation, Tokyo (JP)

( * ) Notice: Subject to any disclaimer, the term of this patent is extended or adjusted under 35 U.S.C. 154(b) by 1232 days.

(21) Appl. No.: 11/559,143

(22) Filed: Nov. 13, 2006

(65) Prior Publication Data

US 2007/0206923 A1    Sep. 6, 2007

(30) Foreign Application Priority Data

Nov. 14, 2005  (JP) ................................. 2005-328556

(51) Int. Cl.
*H04N 9/80* (2006.01)

(52) U.S. Cl. ........................................ 386/241; 715/723

(58) Field of Classification Search .................. 386/239, 386/240, 241; 715/723, 838, 841
See application file for complete search history.

(56) References Cited

U.S. PATENT DOCUMENTS

| | | | |
|---|---|---|---|
| 6,487,360 B1 * | 11/2002 | Sumiyoshi et al. | 386/52 |
| 7,725,837 B2 * | 5/2010 | Wong et al. | 715/815 |
| 7,743,343 B2 * | 6/2010 | Fong et al. | 715/841 |
| 2002/0033848 A1 * | 3/2002 | Sciammarella et al. | 345/838 |
| 2005/0111829 A1 * | 5/2005 | Ito et al. | 386/69 |
| 2006/0054476 A1 * | 3/2006 | Kubo et al. | 200/5 R |
| 2006/0098941 A1 | 5/2006 | Abe et al. | |

FOREIGN PATENT DOCUMENTS

| | | |
|---|---|---|
| JP | 2002-109825 | 4/2002 |
| JP | 2004-319077 | 11/2004 |
| JP | 2004-356774 | 12/2004 |
| JP | 2005-33308 | 2/2005 |
| JP | 2005-122893 | 5/2005 |

OTHER PUBLICATIONS

Office Action issued Aug. 10, 2010, in Japanese Patent Application.

* cited by examiner

*Primary Examiner* — Thai Tran  
*Assistant Examiner* — Mishawn Dunn  
(74) *Attorney, Agent, or Firm* — Oblon, Spivak, McClelland, Maier & Neustadt, L.L.P.

(57) ABSTRACT

An information processing apparatus includes a first display control section, a first input section, and a second display control section. The first display control section controls displaying of a plurality of content representative pictures so that the content representative pictures are displayed and arranged in a first direction. The content representative pictures represent a plurality of titles of content. Each of the titles of content is made up of a plurality of structural units. The first input section inputs a first user's operation to select one content representative picture from the displayed content representative pictures. The second display control section controls displaying of structural unit representative pictures so that the structural unit representative pictures are displayed and arranged in a second direction starting from the selected content representative picture when the first user's operation is input. The structural unit representative pictures represent the structural units of the title of content.

13 Claims, 8 Drawing Sheets

INFORMATION PROCESSING APPARATUS, DISPLAY METHOD THEREOF, AND PROGRAM THEREOF

CROSS REFERENCES TO RELATED APPLICATIONS

The present invention contains subject matter related to Japanese Patent Application JP 2005-328556 filed in the Japanese Patent Office on Nov. 14, 2005, the entire contents of which being incorporated herein by reference.

BACKGROUND OF THE INVENTION

1. Field of the Invention

The present invention relates to an information processing apparatus such as a reproducing apparatus that can reproduce content such as a moving picture and a still picture and a recording and reproducing apparatus that can also record content. The present invention also relates to a display method and a program of such an information processing apparatus.

2. Description of the Related Art

A kind of content such as a moving picture recorded in a hard disk drive (HDD) and a digital versatile disc (DVD) is made up of a plurality of structural units such as chapters. This content can be reproduced for one structural unit at a time. For example, a moving picture made up of a plurality of chapters can be searched for a desired scene on the chapter basis.

With respect to the chapter basis content reproducing technology, a video content reproducing apparatus is disclosed in Japanese Patent Application Laid-Open NO. 2005-33308 (paragraph 0006, FIG. 3). In this apparatus, a menu window and a preview window are provided. The menu window displays a chapter menu indicating reduced pictures each of which is a picture at the start position of each chapter. The user can select a chapter with the chapter menu on the menu window. Video content is reproduced from the beginning of the selected chapter on the preview window. A reproducing process is repeated on the preview window until the user inputs a preview stop command. When the user inputs the preview stop command, the apparatus closes the preview window and the menu window. Thereafter, the apparatus sets up a main window and reproduces the content after the stop position of the chapter on the main window. As a result, while checking the picture of each chapter of the content, the user can easily search for his or her favorite chapter.

SUMMARY OF THE INVENTION

However, in the technology described in the foregoing related art reference, the chapter menu is displayed when the user calls up the chapter menu while video content is being reproduced on the main window. Thus, when video content is reproduced on the chapter basis, it is necessary to perform many operations step by step. In other words, there is a necessity to reproduce the video content on the main window from the beginning, display the chapter menu, and select a favorite chapter. For example, when the user wants to reproduce only his or her favorite scene, these bothersome operations will deteriorate the user-friendliness.

In view of the foregoing, it would be desirable to provide an information processing apparatus, a display method thereof, and a program thereof that allow content made up of a plurality of structural units to be easily reproduced in a small number of operations on the structural unit basis.

According to an embodiment of the present invention, there is provided an information processing apparatus. The information processing apparatus includes a first display control section, a first input section, and a second display control section. The first display control section controls displaying of a plurality of content representative pictures so that the content representative pictures are displayed and arranged in a first direction. The content representative pictures represent a plurality of titles of content. Each of the plurality of titles of content is made up of a plurality of structural units. The first input section inputs a first user's operation to select one content representative picture from the displayed content representative pictures. The second display control section controls displaying of structural unit representative pictures so that the structural unit representative pictures are displayed and arranged in a second direction starting from the selected content representative picture when the first user's operation is input. The structural unit representative pictures represent the structural units of the title of content. The second direction is different from the first direction.

Examples of the information processing apparatus include optical disc reproducing apparatuses such as a DVD player and a Blu-ray disc player, recording and reproducing apparatuses such as a HDD/DVD (or Blu-ray) recorder, a television receiver that has a recording/reproducing function, a personal computer (PC), and a game machine. Examples of titles of content include still pictures such as photo data, moving pictures such as video data, and music files. Display control means not only controlling displaying of each picture so that each picture is displayed on a display unit of the information processing apparatus, but also controlling displaying of each picture so that each picture is displayed on an external display unit connected to the information processing apparatus.

In this structure, since the plurality of titles of content and structural units of each of titles of content are displayed on the same screen, the user can easily check the structural units of each title of content in a small number of operations.

The information processing apparatus may also include a second input section and a reproduction control section. The second input section inputs a second user's operation to select one structural unit representative picture of the displayed structural unit representative pictures. The reproduction control section controls reproducing of the structural unit of the title of content so that the structural unit is reproduced when the second user's operation is input.

The reproduction control section controls displaying of the still picture data and moving picture data so that they are displayed on the display of the information processing apparatus or the external display unit connected to the information processing apparatus. In addition, the reproduction control section controls outputting of sound data so that the sound data is output to a speaker of the information processing apparatus or an external speaker connected to the information processing apparatus. Thus, the user can easily perform operations including selection operations for a favorite title and a favorite structural unit and a reproduction operation for the desired structural unit on one screen in a small number of operations. Thus, the user-friendliness is improved.

The information processing apparatus may also include a marker display control section. The marker display control section controls displaying of a maker so that the marker is movable on the displayed content representative pictures and the displayed structural unit representative pictures. The first user's operation and the second user's operation are input with the marker.

Examples of the marker include a frame-shaped cursor, a semi-transparent picture that has nearly the same shape as each of the content representative pictures or each of the structural unit representative pictures and that is superimposed thereon, and a picture having a different color from each of the content representative pictures or each of the structural unit representative pictures.

The first user's operation is accomplished by just placing the marker on a particular content representative picture with the cross keys of the remote controller or the like or by doing that and then pressing the enter key of the remote controller. Likewise, the second user's operation is accomplished by placing the marker on a particular structure unit representative picture with the cross key of the remote controller or the like and then pressing the enter key of the remote controller. Thus, by just moving the marker and performing key operations, for example, with the remote controller on the same screen, the user can easily perform operations including a reproduction operation for one title of content on the unit structure basis.

Each of the titles of content may be a moving picture made up of a plurality of frames. The structural units may be chapters which segment the moving picture into a plurality of regions. Each of the structural unit representative pictures is a thumbnail picture of the start frame of each of the chapters. The second display control section controls displaying of the thumbnail picture of each of the chapters so that the thumbnail picture is displayed in the second direction in the time series. The reproduction control section controls reproducing of the moving picture of the selected chapter so that the moving picture is reproduced from the start frame when the second user's operation is input.

Thus, the user can easily select his or her desired chapter of a plurality of titles of content on one screen in a small number of operations and cause the apparatus to reproduce the selected chapter.

The first direction may be nearly perpendicular to the second direction.

Thus, a group of content representative pictures aligned to form a bar and a group of structural unit representative pictures aligned to form a bar are displayed, so that the two bars are perpendicular to each other. Thus, by just moving the marker in the vertical and horizontal directions, placing the marker on a thumbnail picture of his or her favorite structural unit, and performing key operations, for example, with the remote controller on the screen, he or she can intuitively select his or her desired structural unit and cause the apparatus to reproduce the selected structural unit.

The second display control section may controls displaying of the structural unit representative pictures so that the structural unit representative pictures are displayed and their sizes are gradually decreased in the second direction.

Thus, if the structural units are provided with a predetermined order and a chronological element (i.e. the structural units are chapters and the like), the relationship of the structural units can be clearly indicated in such a manner that the sizes of the structure unit representative pictures are gradually decreased in the time series according to the order and chronological element. Thus, when the user selects his or her desired structural unit, the user-friendliness is improved.

The second display control section may controls displaying of the thumbnail pictures so that the thumbnail pictures are displayed and the durations of the chapters in a total reproduction duration of the moving picture are correlated with the distances of the thumbnail pictures.

Thus, since the durations between chapters are correlated with the distances of the thumbnail pictures, the user can select his or her desired chapter while checking the durations between the chapters. Thus, the user-friendliness is improved.

The information processing apparatus may also include a third display control section, a third input section, and a marker display control section. The third display control section controls displaying of a plurality of category pictures so that the category pictures are displayed in a third direction which is different from the first direction. The category pictures indicate categories of the titles of content. The third input section inputs a third user's operation to select one category picture of the displayed category pictures. The marker display control section controls displaying of a marker so that the marker is movably displayed on the category pictures. The third user's operation is input with the marker. The first display control section control displaying of the content representative pictures so that the content representative pictures are displayed in the first direction starting from the selected category picture when the third user's operation is input.

Examples of the categories include recorded moving pictures, satellite broadcast/ground terrestrial broadcast moving pictures, still pictures such as photos, and music files. Thus, the user can perform operations including selection operations for a category of titles of content, a title of the category, and a structural unit of the title and a reproduction operation for the selected structural unit on one display screen. Thus, the user-friendliness is improved.

The first direction may be nearly in parallel with the third direction. The second direction may be nearly perpendicular to the first direction and the third direction.

Thus, the user can perform operations including selection operations for a category of titles of content and a structural unit of a title and a reproduction operation for the selected structural unit on one screen only with selection operations in the upper, lower, left and right directions. Thus, the user-friendliness is further improved.

Titles of content may be broadcast moving pictures. The information processing apparatus may also include a receive section, a segmentation section, a record section, and a storage section. The receive section receives each of the broadcast moving pictures. The segmentation section segments each of the received moving pictures into a plurality of chapters in a predetermined condition. The record section records the plurality of segmented chapters of the moving picture. The storage section stores the moving picture representative pictures which represent the moving pictures and chapter representative pictures which represent the segmented chapters of each of the moving pictures.

The segmentation section segments a moving picture into chapters in the predetermined condition. Examples of the predetermined condition include a predetermined period (for example, five minutes), a change between a main part of a program and a commercial message (CM), and a scene change in the main part. Thus, not only titles segmented into chapters and recorded on another medium such as a DVD or a Blu-ray disc by another apparatus, but each chapter of a moving picture received by the information processing apparatus, segmented into chapters, and recorded on the medium, a HDD, or the like can be easily reproduced on one screen in a small number of operations.

The segmentation section may also include a section that extracts feature point information from each of the received moving pictures and generates segmentation position information with which each of the moving picture is segmented into chapters according to the extracted feature point information.

Examples of the feature point include a scene change and a feature scene such as a change between a commercial message and a main part of a program. Thus, the moving picture can be segmented into chapters. As a result, the chapters can be easily selected and reproduced.

The information processing apparatus may also include a stop control section and a stop position storage section. A stop control section controls the reproduction of the particular moving picture so that he reproduction of the particular moving picture is stopped. The stop position storage section stores stop position information of the particular moving picture whose reproduction has been stopped. The second display control section may include a section for controlling displaying of a thumbnail picture of the frame at the reproduction stop position so that the thumbnail picture is displayed next to the chapter representative pictures according to the stop position information when the particular moving picture is reproduced again after its reproduction is stopped. The second input section may include a fourth user's operation input section that inputs a fourth user's operation to select a thumbnail picture of the frame at the reproduction stop position. The reproduction control section may include a section for controlling reproducing of the moving picture so that the moving picture is reproduced from the reproduction stop position when the fourth user's operation is input.

Thus, since the thumbnail picture of the frame at the stop position and the chapter representative pictures are displayed next to each other, a so-called resume function for resuming the reproduction from the stop position and the reproduction on the chapter basis can be easily performed on one screen. As a result, the user-friendliness is improved.

According to an embodiment of the present invention, there is provided a display method. Displaying of a plurality of content representative pictures is controlled so that the content representative pictures are displayed and arranged in a first direction. The content representative pictures represent a plurality of titles of content. Each of the plurality of titles of content is made up of a plurality of structural units. A first user's operation is input to select a content representative picture of a title of content from the displayed content representative pictures. Structural unit representative pictures are controlled so that the Structural unit representative pictures are displayed starting from the selected content representative picture and arranged in a second direction when the first user's operation is input. The Structural unit representative pictures represent the structural units of the title of content. The second direction is different from the first direction.

According to an embodiment of the present invention, there is provided a program that causes an information processing apparatus to execute a display method. Displaying of a plurality of content representative pictures is controlled so that the content representative pictures are displayed and arranged in a first direction. The content representative pictures represent a plurality of titles of content. Each of the plurality of titles of content is made up of a plurality of structural units. A first user's operation is input to select a content representative picture of a title of content from the displayed content representative pictures. Structural unit representative pictures are controlled so that the Structural unit representative pictures are displayed starting from the selected content representative picture and arranged in a second direction when the first user's operation is input. The Structural unit representative pictures represent the structural units of the title of content. The second direction is different from the first direction.

According to embodiments of the present invention, a title of content made up of a plurality of structural units can be easily reproduced in a small number of operations on the structural unit basis.

These and other objects, features and advantages of the present invention will become more apparent in light of the following detailed description of best mode embodiments thereof, as illustrated in the accompanying drawings.

DESCRIPTION OF PREFERRED EMBODIMENTS

Next, with reference to the accompanying drawings, embodiments of the present invention will be described.

Figure 1:
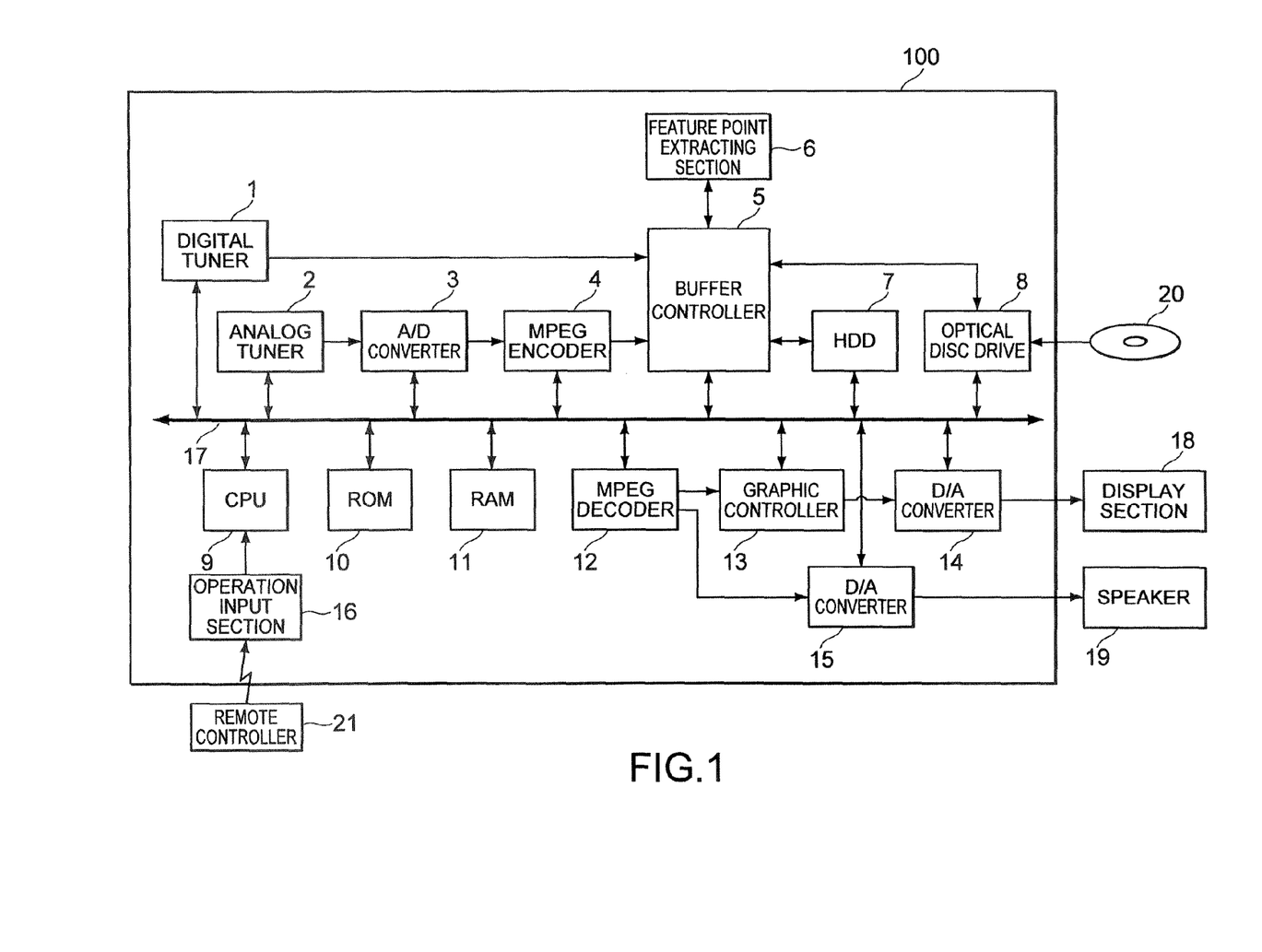
FIG. 1 is a block diagram showing a structure of a record and reproducing apparatus according to an embodiment of the present invention.

FIG. 1 is a block diagram showing a structure of a recording and reproducing apparatus 100 according to an embodiment of the present invention. As shown in FIG. 1, the recording and reproducing apparatus 100 includes a digital tuner 1, an analog tuner 2, an analog/digital (A/D) converter 3, an MPEG encoder 4, a buffer controller 5, a feature point extracting section 6, an HDD 7, an optical disc drive 8, a central processing unit (CPU) 9, a read-only memory (ROM) 10, a random access memory (RAM) 11, an MPEG decoder 12, a graphic controller 13, digital/analog (D/A) converters 14 and 15, and an operation input section 16. Each block of the recording and reproducing apparatus 100 is connected by a system bus 17.

The digital tuner 1 selects a particular channel of digital broadcasts through an antenna (not shown), receives a digital video signal and a digital audio signal, for example, as an MPEG stream, of the selected channel, demodulates these signals, and outputs the demodulated signals to the buffer controller 5.

The analog tuner 2 selects a particular channel of analog broadcasts through the antenna, receives an analog video signal and an analog audio signal of the selected channel, and outputs these signals to the A/D converter 3.

The A/D converter 3 converts the analog video signal and the analog audio signal that have been input from the analog tuner 2 into digital signals and outputs the digital signals to the MPEG encoder 4.

The MPEG encoder 4 encodes the digital video signal and digital audio signal that have been input from the A/D converter 3 into an MPEG stream and outputs the MPEG stream to the buffer controller 5.

The buffer controller 5 controls writing timing and data amount for the digital video signal and digital audio signal that are successively supplied from the digital tuner 1 or the MPEG encoder 4 and that are written to the HDD 7 or the optical disc drive 8 and intermittently writes these signals to the HDD 7 or the optical disc drive 8. In addition, the buffer controller 5 controls read timing and data amount for digital signals recorded in the HDD 7 or the optical disc drive 8 and successively supplies an MPEG stream intermittently read from the HDD 7 or the optical disc drive 8 to the MPEG decoder 12.

While the HDD 7 or the optical disc drive 8 is performing a seek operation, data are neither read nor written from and to the HDD 7 or the optical disc drive 8. On the other hand, it is expected that the MPEG encoder 4 and the MPEG decoder 12 successively input or output an MPEG stream, respectively. Therefore, the buffer controller 5 buffers the MPEG stream and controls read and write timings for the MPEG stream corresponding to characteristics of the HDD 7 and the optical disc drive 8.

The buffer controller 5 not only exchanges data with the HDD 7 and the optical disc drive 8, but allows the CPU 9 to read and write data to and from the HDD 7 and the optical disc drive 8 through the system bus 17.

The HDD 7 records not only the received MPEG stream as each title (broadcast program) of video content but also various types of software programs and data to an embedded hard disk and reads them therefrom. In addition, the HDD 7 also records title information such as title names and record date/time of recorded video content and thumbnails (reduced) pictures that represent individual titles (hereinafter these thumbnail pictures are referred to as "content representative pictures") and chapter information such as feature point data extracted by the feature point extracting section 6 that will be described later and thumbnail pictures that represent chapters and that are generated on the basis of the feature point data (hereinafter, these thumbnail pictures are referred to as "chapter representative pictures").

The optical disc drive 8 records and reads (reproduces) data such as the foregoing MPEG stream to and from a detachable optical disc 20 such as a DVD (for example, DVD-Video, DVD-RAM, DVD-R, DVD-RW, DVD+R, DVD+RW) or a Blu-ray disc.

The feature point extracting section 6 extracts a feature scene such as a scene change, a change between a commercial message (CM) and a main part of a broadcast program, or a highlight scene from an MPEG stream before or after it is recorded in the HDD 7 or the optical disc drive 8 and designates each change position as a chapter delimiter position for each broadcast program that has been recorded or that will be recorded as an MPEG stream (hereinafter this broadcast program is referred to as a "title"). As a specific feature point extracting method, when feature points are scene changes, a feature point is extracted from each frame based on a luminance component and audio volume information of each frame of the MPEG stream. By comparing the variation and sizes of feature points of individual frames of the MPEG stream, feature scenes are extracted. The scenes are extracted as chapter delimiter positions. When a CM is changed to a main part of a broadcast program or vice versa, a change point of stereo/monaural of an audio signal may be detected as chapter delimiter positions. As described above, the extracted feature data are recorded as a database of chapter information of each title in the HDD 7. In addition, a thumbnail picture of the start frame of each chapter is recorded as a chapter representative picture of each title in the HDD 7.

The CPU 9 is a device that totally controls each block of the apparatus and executes various types of calculation processes according to an operating system (OS), firmware, and so forth stored, for example, in the ROM 10.

The ROM 10 is a nonvolatile memory that permanently stores the OS and firmware such as software programs and various types of parameters. The OS and firmware are executed by the CPU 9.

The RAM 11 is used as a work area or the like for the CPU 9 and is a memory that temporarily stores the OS, programs, process data, and so forth stored, for example, in the ROM 10.

The MPEG decoder 12 performs a decoding process for converting the MPEG file read from the HDD 7 or the optical disc drive 8 through the buffer controller 5 into a digital video signal and a digital audio signal. Thereafter, the MPEG decoder 12 outputs the digital video signal to the graphic controller 13 and the digital audio signal to the D/A converter 15.

The graphic controller 13 performs a graphic process for combining the digital video signal of each title that has been input from the MPEG decoder 12 and the foregoing chapter information and so forth corresponding to each title as an on-screen display (OSD), changing the chapter information, and displaying a menu screen including icons with which the user can select each chapter and outputs resultant data to the D/A converter 14.

The D/A converter 14 converts a digital video signal that has been processed by the graphic controller 13 into an analog video signal (National Television Standards Committee (NTSC) standard signal) and outputs the converted signal to a display section 18 (including a display of a television receiver). The display section 18 displays the analog video signal.

The D/A converter 15 converts the digital audio signal that has been input from the MPEG decoder 12 into an analog audio signal and outputs the analog audio signal to a speaker 19. The speaker 19 outputs the reproduced analog audio signal.

The operation input section 16 is made up of buttons, switches, keys, indicators, and an infrared signal receiving section. The indicators are used for the user to check operations. The infrared signal reception section receives an infrared signal from a remote controller 21. The operation input section 16 inputs various types of setup values and commands corresponding to user's operations and outputs these values and commands to the CPU 9.

The remote controller 21 contains a home key, cross keys (up key, down key, left key, and right key), an enter key, volume keys, and channel keys (not shown). The menu key is used to display a menu screen (hereinafter referred to as the "content selection screen") on the display section 18. The content selection screen is a home screen on which the user can select for example each program and each chapter of content. The cross keys are used to move a marker in the upper, lower, left, and right directions on the content selection screen. The enter key is used to determine the selection of a picture at the position of the marker. The volume keys are used to adjust the sound volume of a television program that is being received. The channel keys are used to change the current channel of television programs. The enter key may be disposed at the center of the cross keys, which are four keys of up, down, left, and right keys. Instead, the cross keys and the enter key may be integrally formed.

In this embodiment, as a compression system for a digital stream, MPEG system is used. Of course, another compression system may be used.

Figure 2:
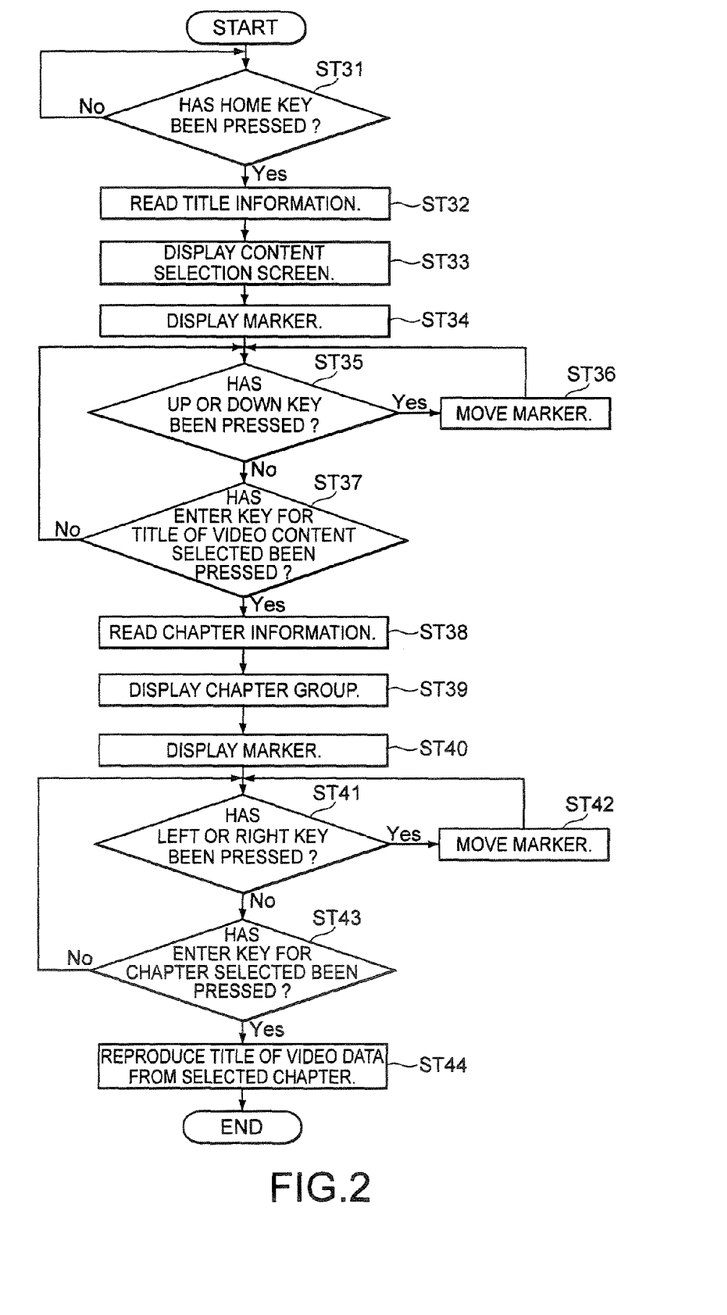
FIG. 2 is a flow chart showing a process of which the recording and reproducing apparatus reproduces each title on a chapter basis.

Next, an operation of the recording and reproducing apparatus 100 according to this embodiment will be described. FIG. 2 is a flow chart showing a process of which the recording and reproducing apparatus 100 reproduces each title on the chapter basis.

As shown in FIG. 2, the recording and reproducing apparatus 100 determines whether or not an input corresponding to the user's operation to display the content display screen on the display section 18 has been performed on the operation input section 16 (the home key has been pressed on the remote controller 21) (at step 31). When the home key has been pressed (YES at step 31), the graphic controller 13 of the recording and reproducing apparatus 100 reads data of title information including content representative pictures of individual titles of video content stored in the HDD 7 under the control of the CPU 9 (at step 32) and displays the content selection screen on the display section 18 on the basis of data that have been read (at step 33).

Figure 3:
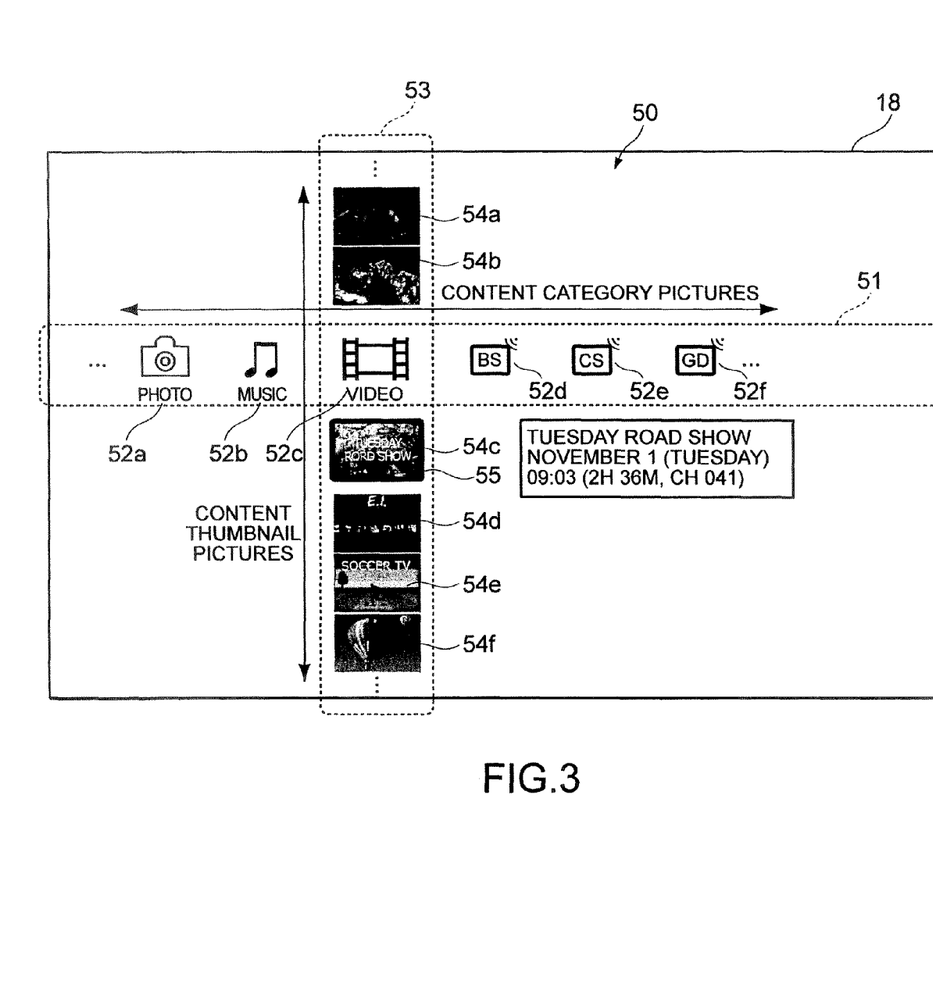
FIG. 3 is a schematic diagram showing an example of a content selection screen.

FIG. 3 is a schematic diagram showing an example of a content selection screen. As shown in FIG. 3, the content selection screen denoted by reference numeral 50 displays a category bar 51 in a lateral direction and a content bar 53 in the vertical direction. The category bar 51 indicates a list of categories of titles of content. The content bar 53 indicates a list of titles of each category. The content bar 53 is perpendicular to the category bar 51.

The category bar 51 indicates category icons 52 including a photo category icon 52a, a music category icon 52b, a BS category icon 52d, a CS category icon 52e, and a ground digital (GD) category icon 52f as well as a video category icon 52c. These icons are aligned in the horizontal direction. The video category icon 52c indicates titles of video content received by the digital tuner 1 or the analog tuner 2 and recorded in the HDD 7. The photo category icon 52a indicates still pictures such as photo files recorded in the HDD 7 or the like. The music category icon 52b indicates music files recoded in the HDD 7, for example, according to an audio compression format such as MPEG Audio Layer 3 (MP3) or Adaptive TRansform Acoustic Coding (ATRAC, registered trademark). The BS category icon 52d indicates broadcasting satellite (BS) programs received by the foregoing tuners. The CS category icon 52e indicates communication satellite (CS) programs. The ground digital category icon 52f indicates ground digital broadcast programs.

Thereafter, the graphic controller 13 displays a marker 55 on the content selection screen. The user selects a title from each category with the marker 55 (at step 34). The marker 55 may be formed, for example, in a cursor shape like a frame. The marker 55 may be one of the category icons 52 whose color or size is changed so that the user can visually know which of the category icons has been selected.

The graphic controller 13 displays content representative pictures 54 of a plurality of titles of a category in the vertical direction of a category icon 52 at the position of the marker 55 (that steps for a predetermined period) when the user moves the marker 55 on each category icon 52 of the category bar 51 with the cross keys. FIG. 3 shows the state that the video category icon 52c has been selected. The content bar 53 indicates content representative pictures 54 of individual titles of video content recorded in the HDD 7 (each content representative picture 54 is for example a thumbnail picture of the start frame of each title).

Thereafter, the recording and reproducing apparatus 100 determines whether the user has moved the marker 55 on a content representative picture 54 in the upper or lower direction with the up key or down key of the cross keys (at step 35). When the user has moved the marker 55 with the up key or down key (YES at step 35), the recording and reproducing apparatus 100 moves the marker 55 in the upper or lower direction corresponding to the user's operation. At this point, the recording and reproducing apparatus 100 scrolls the content representative pictures 54 in the upper or lower direction corresponding to the user's operation. In other words, as shown in FIG. 3, when the user places the marker 55 on the content representative picture 54c and presses the down key, the marker 55 is moved down to the content representative picture 54d. Thereafter, the whole content bar 53 is scrolled upwardly in the reverse direction of the user's key operation so that the content representative picture 54d and the marker 55 are placed at the former position of the content representative picture 54c.

FIG. 3 shows the state that the marker 55 is placed at the content representative picture 54c of the content representative pictures 54 of the video category. When the marker 55 is placed at a particular content representative picture 54, information about the title is indicated in a lateral direction of the marker 55. When the particular content is a video content, information about title contains for example title name, record date/time, total reproduction duration, and reception channel.

Thereafter, the graphic controller 13 determines whether the enter key has been pressed by the user in the state that the marker 55 has been placed at a particular content representative picture 54 of the video content (at step 37). When the enter key has been pressed (YES at step 37), the recording and reproducing apparatus 100 reads chapter information such as chapter representative pictures of individual chapters of a particular title of video content recorded in the HDD 7 (at step 38). Based on chapter information that has been read, a chapter bar 56 made up of a group of chapter representative pictures 57 is displayed nearly in parallel with the category bar 51, starting with the content representative picture 54 (at step 39).

Figure 4:
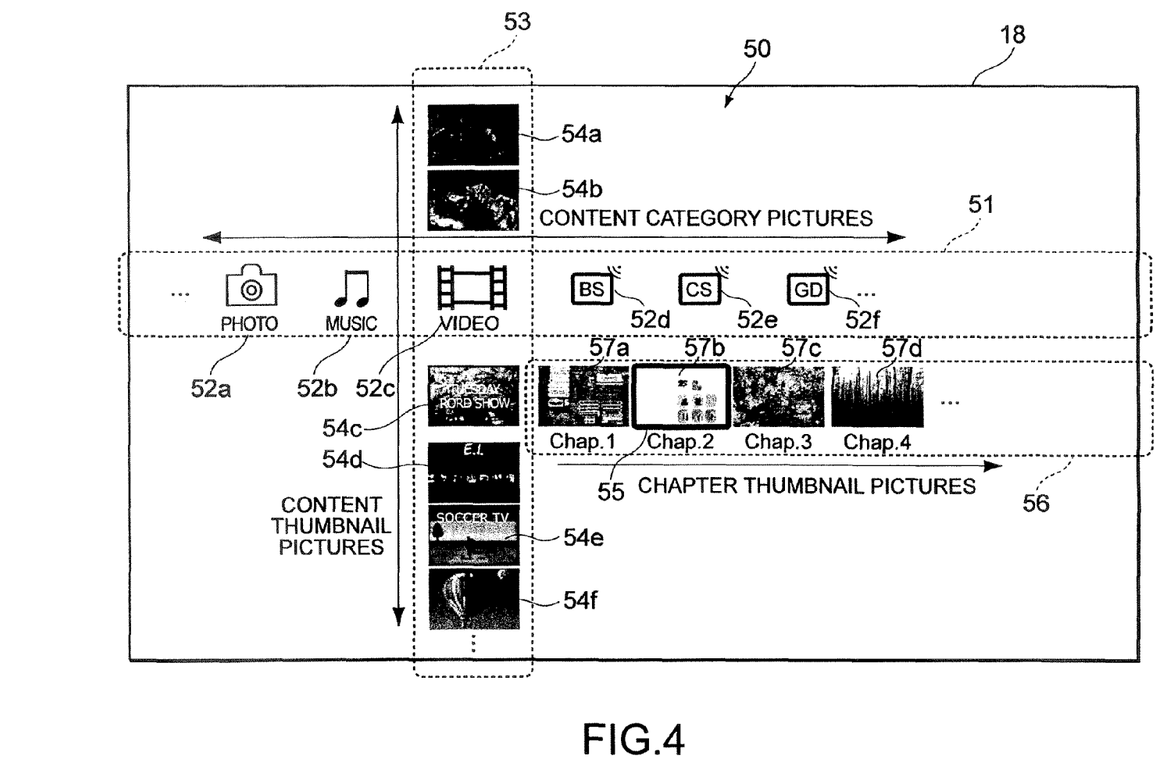
FIG. 4 is a schematic diagram showing an example of the content selection screen in the case that a chapter bar is displayed.

FIG. 4 is a schematic diagram showing an example of the content selection screen 50 in the case that the chapter bar 56 is displayed. As shown in FIG. 4, each chapter representative picture is a thumbnail picture of the start frame of each chapter. Chapter representative pictures are displayed on the right of the content representative picture 54 in the order of a chapter representative picture 57a as chapter 1, a chapter representative picture 57b as chapter 2, and so forth, namely, in time series.

Thereafter, the graphic controller 13 displays the marker 55 so that it moves on the chapter bar 56 (at step 40) and determines whether the left key or right key of the cross keys has been pressed by the user. When the left key or right key has been pressed by the user (YES at step 41), the graphic controller 13 moves the marker 55 corresponding to the user's operation (at step 42). Instead, when the left key or the right key has been pressed, the chapter bar 56 may be scrolled in the reverse direction of the user's key operation like the foregoing content bar 53.

Thereafter, in the state that the marker 55 has been placed at one chapter representative picture 57, the graphic controller 13 determines whether the enter key for the selected chapter has been pressed (at step 43). When the enter key has been pressed (YES at step 43), the CPU 9 reads an MPEG file of the selected chapter from MPEG files of video content recorded in the HDD 7. The MPEG decoder 12 performs a decoding process for the selected file and sends the decoded file to the display section 18 and the speaker 19 through the graphic controller 13, the D/A converter 14, and the D/A converter 15. The display section 18 and the speaker 19 reproduce a video signal and an audio signal of the selected chapter, respectively (at step 44). In FIG. 4, since the chapter representative picture 57b as chapter 2 of video content corresponding to the content representative picture 54c has been selected, when the enter key is pressed, the recording and reproducing apparatus 100 reproduces chapter 2. The recording and reproducing apparatus 100 repeats the foregoing process whenever the user's operation is performed.

When a category other than video category has been selected, the recording and reproducing apparatus 100 displays content representative pictures 54 as a list of titles of the category in the vertical direction of the category icon 52. When a particular content representative picture 54 has been selected with the marker 55, the cross keys, and the enter key, the recording and reproducing apparatus 100 displays a bar of structural unit representative pictures that represent a plurality of structural units of titles of the category like the chapter bar 56.

Figure 5:
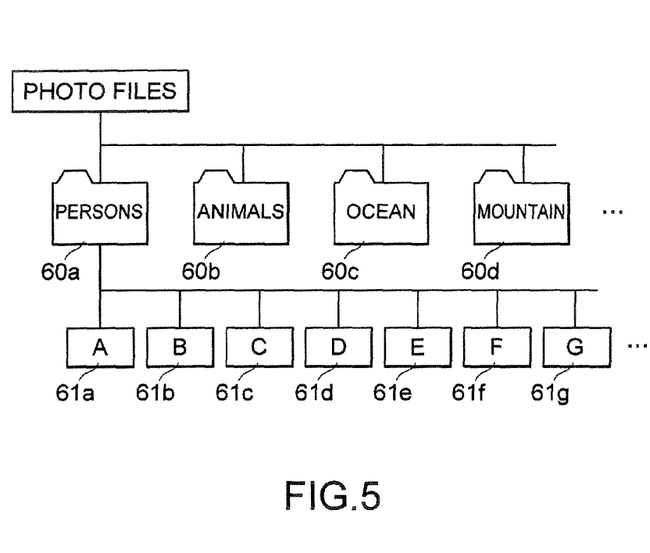
FIG. 5 is a schematic diagram showing a group structure of photo files.

For example, as shown in FIG. 5, it is assumed that the photo category is sub-categorized as a plurality of groups (for example, a photo file group 60a for persons, a photo file group 60b for animals, a photo file group 60c for ocean scenes, a photo file group 60d for mountain scenes, and so forth) each of which contains a plurality of photo files.

In this case, the recording and reproducing apparatus 100 displays thumbnail pictures of photo files (each having the latest photograph date/time) that represent individual groups (60a, 60b, and so forth) on the content bar 53 as the content representative picture 54. When the enter key has been pressed for a particular group on the content bar 53 by the user, the bar of the thumbnail pictures of photo files of the group is displayed in the horizontal direction, starting with a particular content representative picture 54 like the chapter bar 56. When the enter key has been pressed for a particular photo file on the bar by the user, the photo file is displayed on the display section 18. Photo files may be sub-categorized for example according to photograph date/time (for example, every month) rather than photograph object categories.

When a music category is sub-categorized, for example, as artists, albums, genres (rock, pop, jazz, and so forth), the recording and reproducing apparatus 100 displays groups as content representative pictures 54 (not shown) on the category bar 51 like the photo category. When a particular group has been selected by the user, a list of icons of music files of the group is displayed as a bar of structural unit representative pictures. When the enter key has been pressed for a particular music file on the bar, an audio signal of the music file is output from the speaker 19.

When a BS category, a CS category, or a GD category has been selected, the recording and reproducing apparatus 100 displays icons (not shown) indicating channels of broadcasts as content representative pictures 54 in the vertical direction of the category icons 52. When the enter key has been pressed for a particular channel, a video signal and an audio signal of the broadcast program received by the digital tuner 1 or the analog tuner 2 are output from the display section 18 and the speaker 19.

With the foregoing operation, the user can easily select his or her favorite chapter of his or her favorite title of video content with the up, down, left, and right moving operations using the cross keys of the remote controller 21 and the determination operation using the enter key on the content selection screen 50. As a result, when video content is reproduced on the chapter basis, the operability for the user is improved.

According to the foregoing embodiment, the recording and reproducing apparatus 100 horizontally displays structural unit representative pictures such as chapter representative pictures 57 so that the chapter representative images 57 are perpendicular to the content bar 53 and are in parallel with the category bar 51. Instead, the recording and reproducing apparatus 100 may diagonally display the structural unit representative pictures against the content bar 53 and the category bar 51.

Figure 6:
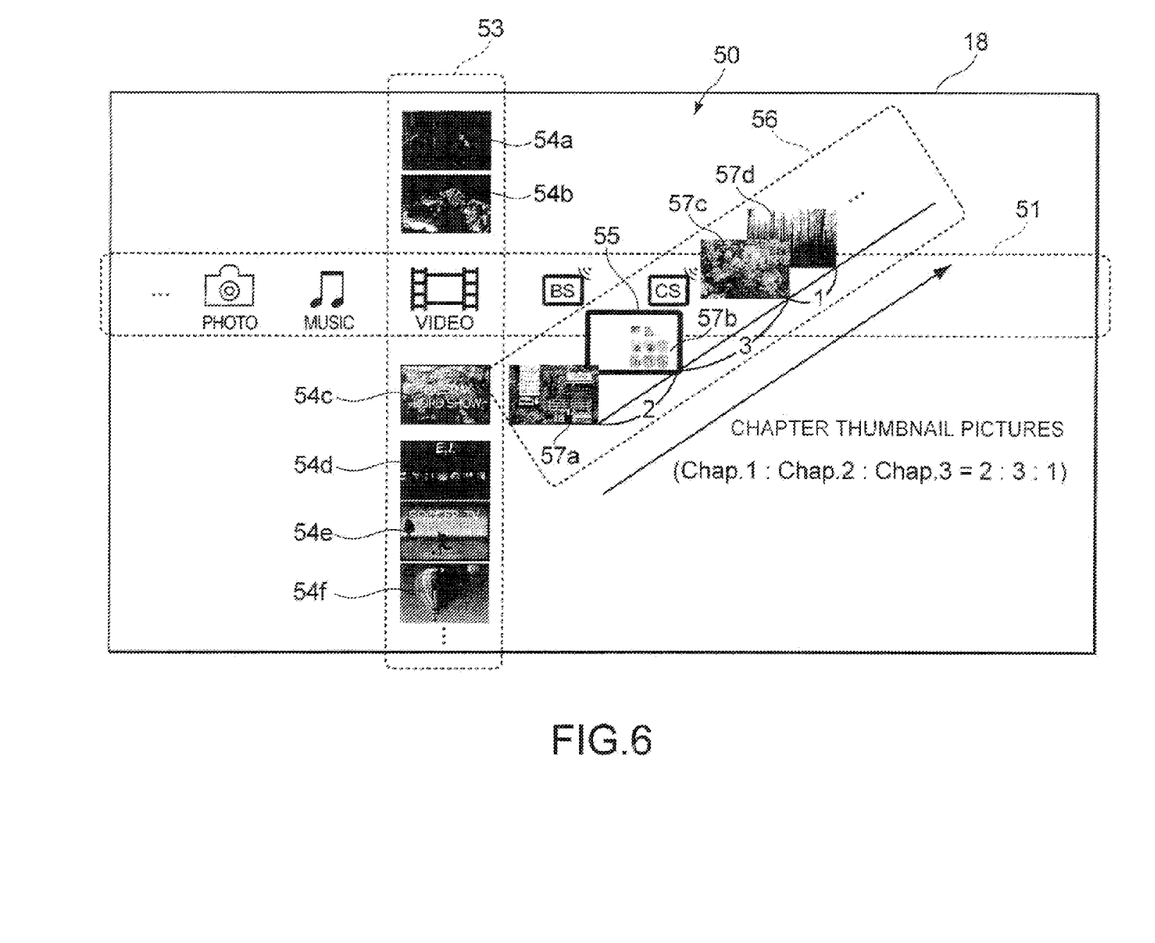
FIG. 6 is a schematic diagram showing an example of a screen on which chapter representative pictures are diagonally displayed according to another embodiment of the present invention.

FIG. 6 is a schematic diagram showing an example of the content selection screen 50 on which the chapter representative pictures 57 are diagonally displayed. As shown in FIG. 6, when the enter key has been pressed for the content representative picture 54c, the recording and reproducing apparatus 100 displays the chapter representative pictures 57 in the right diagonal direction, starting with the content representative picture 54c. Thereafter, when the user moves the marker 55 to a chapter representative picture 57 of the favorite chapter with the left key or right key of the cross keys and presses the enter key, the selected chapter is reproduced. In this case, when the user pressed the left key or right key, the chapter bar 56 may be diagonally scrolled.

At this point, as shown in FIG. 6, the durations of individual chapters in the total duration of each title may be displayed as the distances between chapter representative pictures 57 of individual chapters. When the ratio of durations of chapters 1, 2, and 3 is 2:3:1, the chapter representative pictures are displayed so that the distances of the chapter representative pictures 57a, 57b, and 57c are 2:3:1. Thus, the user can select a chapter to be reproduced while checking the duration of each chapter.

Figure 7:
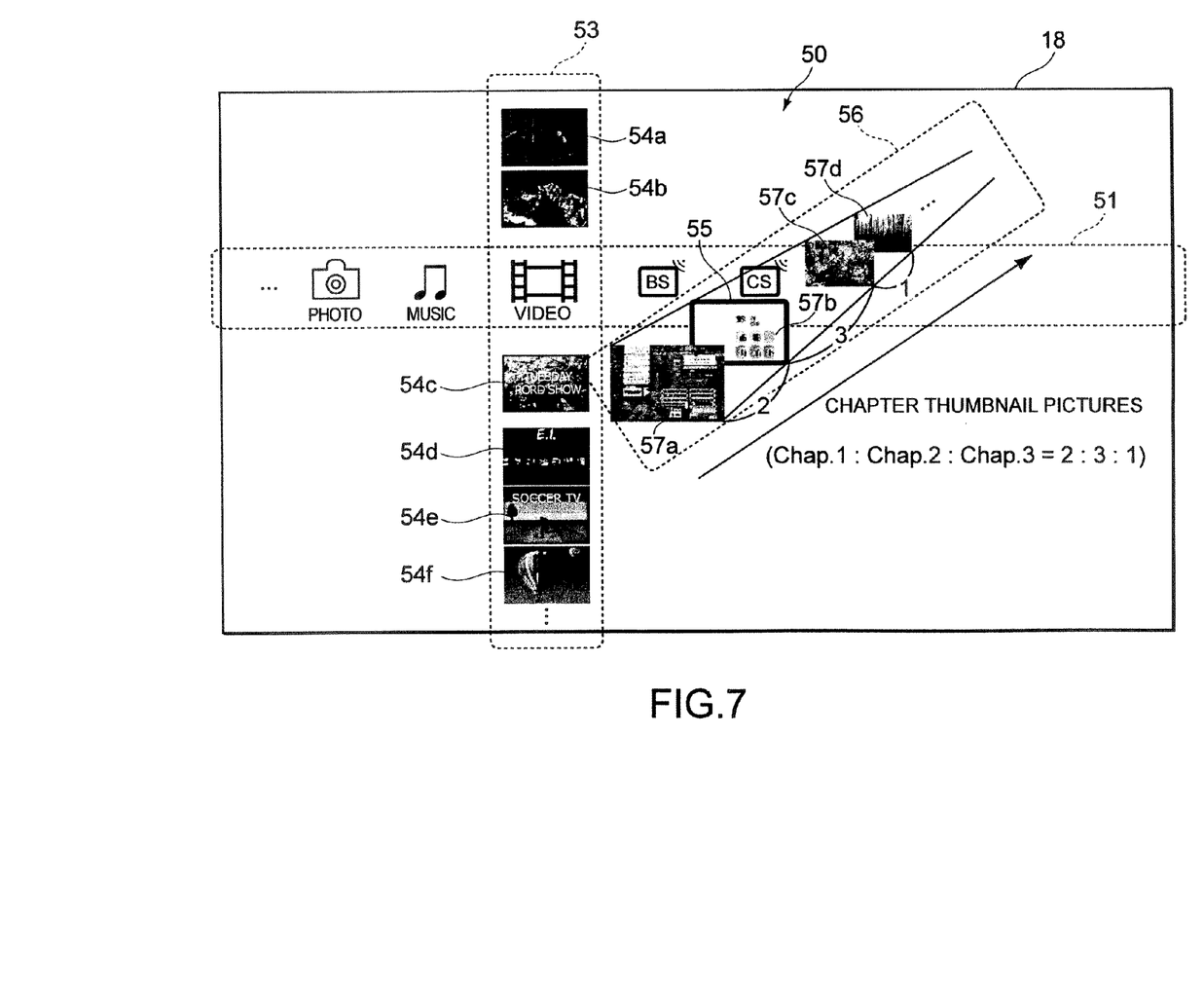
FIG. 7 is a schematic diagram showing an example of a screen on which chapter representative pictures are diagonally and three-dimensionally displayed according to another embodiment of the present invention.

In addition, as shown in FIG. 7, the chapter representative pictures 57 may be three-dimensionally displayed in such a manner that the sizes of the chapter representative pictures that represent individual chapters are gradually decreased in the order of chapter numbers. For example, in the chapter representative pictures 57 corresponding to the content representative picture 54c, the chapter representative picture 57a that represents the start chapter is displayed in the largest size. The chapter representative pictures 57b, 57c, and so forth that represent the chapters are displayed in the sizes that are gradually decreased. In this case, the durations of the chapters may be correlated with the distances of the chapter representative pictures 57. Thus, the user can select his or her favorite chapter to be reproduced while checking the relationship of durations and positions of the chapters with more ease.

Figure 8:
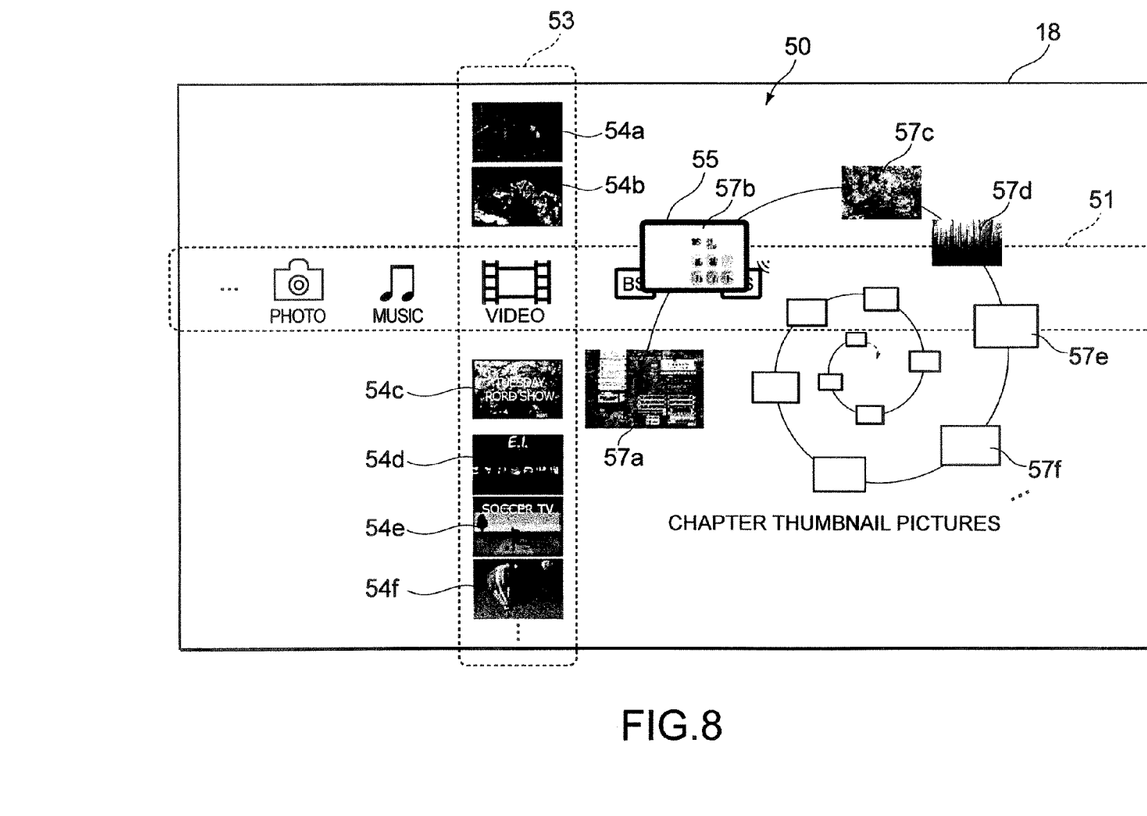
FIG. 8 is a schematic diagram showing an example of a screen on which chapter representative pictures are spirally displayed according to another embodiment of the present invention.

In addition, as shown in FIG. 8, each chapter representative picture 57 may be spirally and three-dimensionally displayed. In this case, when the user presses the left key or right key, the whole chapter representative pictures 57 may be spirally rotated. In this display method, the user can select his or her favorite chapter to be reproduced while checking the relationship of the durations and positions of the chapters with more ease. In addition, the display method of which the chapter representative pictures are displayed horizontally, diagonally, or spirally may be selected according to the user's preference.

In the foregoing embodiments, categories such as video, photo, and music were described. If the recording and reproducing apparatus 100 has a connection function for a semiconductor memory, for example, a memory stick (trademark) or a flash memory with USB connector and the semiconductor memory is capable of storing various types of files that are categorized, the category of the semiconductor memory may be displayed on the content selection screen 50. In other words, when such a semiconductor memory is connected to the recording and reproducing apparatus 100, thumbnail pictures that represent individual groups of for example photo files stored in the semiconductor memory may be displayed as the chapter representative pictures 54 in the vertical direction. When the user selects a content representative picture 54 of a particular group, structural unit representative pictures of individual files may be horizontally, diagonally, or spirally displayed as structural units of the group.

In the foregoing embodiments, when the marker 55 is placed at a particular chapter representative picture 54 on the content bar 53 and the enter key is pressed for the chapter representative picture 54, individual chapter representative pictures 57 are displayed. Instead, when the marker 55 is placed on a particular chapter representative picture 54, individual chapter representative pictures 57 may be displayed. In this case, when the marker 55 is placed on a particular chapter representative picture 54 for a predetermined period, individual chapter representative pictures 57 may be displayed. Thus, the number of steps that the user performs to select a chapter can be decreased. As a result, the operability for the user is improved. On the other hand, the selection of the mode of which when the marker 55 is placed on a particular chapter representative picture 54 and the enter key is pressed, chapter representative pictures are displayed or the mode of which when the marker 55 is placed on a particular chapter representative picture 54, chapter representative pictures are displayed may be customized according to the user's preference.

When the recording and reproducing apparatus 100 has a so-called resume function, namely when the reproduction stop position is stored and the reproduction is started from the last stop position, both the resume function and the chapter selection function may be provided on the content selection screen 50. In other words, when the user selects a particular chapter representative picture 54 on the content selection screen 50, a thumbnail picture of the frame corresponding to the last stop position by the resume function may be displayed on one side of the chapter representative picture 54. The thumbnail picture may be followed by chapter representative pictures 57 like the foregoing embodiments. When the user selects the thumbnail pictures of the frame at the last stop position and presses the enter key, the title is reproduced from the frame corresponding to the last stop position. When the user selects a particular chapter representative picture 57 and presses the enter key, the title is reproduced from this chapter. Thus, the title can be reproduced depending on whether the user wants to reproduce it from the last stop position or particular chapter. As a result, the operability for the user is improved.

The foregoing embodiments are applied to the recording and reproducing apparatus 100. Instead, the embodiments may be applied to various types of information processing apparatuses for example reproducing apparatuses (such as a DVD player and a Blu-ray disc player), a PC, and a game machine.

It should be understood by those skilled in the art that various modifications, combinations, sub-combinations and alternations may occur depending on design requirements and other factors insofar as they are within the scope of the appended claims or the equivalents thereof.

What is claimed is:

1. An information processing apparatus, comprising:
   a first display control section configured to control displaying of a plurality of content representative pictures so that the content representative pictures are displayed and arranged in a first direction, the content representative pictures representing a plurality of titles of content, each of the plurality of titles of content being made up of a plurality of structural units;
   a first input section configured to input a first user operation to select a content representative picture of a title of a content from the displayed content representative pictures;
   a second input section configured to input a second user operation to select one structural unit representative picture of the displayed structural unit representative pictures; and
   a reproduction control section configured to control reproducing of the structural unit of the title of content so that the structural unit is reproduced when the second user operation is input; and
   a second display control section configured to control displaying of structural unit representative pictures so that the structural unit representative pictures simultaneously with the content representative pictures, the structural unit representative pictures being displayed and arranged in a single file in a second direction, a first structural unit representative picture being displayed adjacent to the selected content representative picture in the second direction when the first user operation is input and remaining structural unit representative pictures being displayed in the single file after the first structural unit representative picture, the structural unit representative pictures represent chapters of the title of content, the second direction being different from the first direction, each of the titles of content is a moving picture made up of a plurality of frames, the structural units are chapters which segment the moving picture into a plurality of regions, each of the structural unit representative pictures is a thumbnail picture of the start frame of each of the chapters, the second display control section controls displaying of the thumbnail picture of each of the chapters so that the thumbnail picture is displayed in the second direction in the time series, the reproduction control section controls reproducing of the moving picture of the selected chapter so that the moving picture is reproduced from the start frame when the second user operation is input, and the second display control section controls displaying of the thumbnail pictures so that the thumbnail pictures are displayed and the durations of the chapters in a total reproduction duration of the moving picture are correlated with the distances between the thumbnail pictures.

2. The information processing apparatus as set forth in claim 1, further comprising:
   a marker display control section configured to control displaying of a marker so that the marker is movable on the displayed content representative pictures and the displayed structural unit representative pictures, the first user operation and the second user operation being input with the marker.

3. The information processing apparatus as set forth in claim 1, wherein the first direction is nearly perpendicular to the second direction.

4. The information processing apparatus as set forth in claim 1, wherein the second display control section controls displaying of the structural unit representative pictures so that the structural unit representative pictures are displayed and their sizes are gradually decreased in the second direction.

5. The information processing apparatus as set forth in claim 2, further comprising:
   a third display control section configured to control displaying of a plurality of category pictures so that the category pictures are displayed in a third direction which is different from the first direction, the category pictures indicating categories of the titles of content; and third input section for inputting a third user operation to select one category picture of the displayed category pictures; wherein the marker display control section controls displaying of a marker so that the marker is movably displayed on the category pictures, the third user operation being input with the marker, wherein the first display control section controls displaying the content representative pictures so that the content representative pictures are displayed in the first direction starting from the selected category picture when the third user operation is input.

6. An information processing apparatus, comprising:

a first display control section configured to control displaying of a plurality of content representative pictures so that the content representative pictures are displayed and arranged in a first direction, the content representative pictures representing a plurality of titles of content, each of the plurality of titles of content being made up of a plurality of structural units;

a first input section configured to input a first user operation to select a content representative picture of a title of a content from the displayed content representative pictures;

a second display control section configured to control displaying of structural unit representative pictures so that the structural unit representative pictures simultaneously with the content representative pictures, the structural unit representative pictures being displayed and arranged in a single file in a second direction, a first structural unit representative picture being displayed adjacent to the selected content representative picture in the second direction when the first user operation is input and remaining structural unit representative pictures being displayed in the single file after the first structural unit representative picture, the structural unit representative pictures represent chapters of the title of content, the second direction being different from the first direction, the first direction is nearly in parallel with the third direction, and the second direction is nearly perpendicular to the first direction and the third direction;

a second input section configured to input a second user operation to select one structural unit representative picture of the displayed structural unit representative pictures;

a reproduction control section configured to control reproducing of the structural unit of the title of content so that the structural unit is reproduced when the second user operation is input;

a marker display control section configured to control displaying of a marker so that the marker is movable on the displayed content representative pictures and the displayed structural unit representative pictures, the first user operation and the second user operation being input with the marker; and a third display control section configured to control displaying of a plurality of category pictures so that the category pictures are displayed in a third direction which is different from the first direction, the category pictures indicating categories of the titles of content; and third input section for inputting a third user operation to select one category picture of the displayed category pictures; wherein the marker display control section controls displaying of a marker so that the marker is movably displayed on the category pictures, the third user operation being input with the marker, wherein the first display control section controls displaying the content representative pictures so that the content representative pictures are displayed in the first direction starting from the selected category picture when the third user operation is input.

7. The information processing apparatus as set forth in claim 1, wherein titles of content are broadcast moving pictures, and wherein the information processing apparatus further comprises:

a receive section configured to receive each of the broadcast moving pictures;

a segmentation section configured to segment each of the received moving pictures into the plurality of chapters in a predetermined condition;

a record section configured to record the plurality of segmented chapters of the moving picture; and a storage section configured to store the moving picture representative pictures which represent the moving pictures and chapter representative pictures which represent the segmented chapters of each of the moving pictures.

8. The information processing apparatus as set forth in claim 7, wherein the segmentation section includes:

a section configured to extract feature point information from each of the received moving pictures and generating segmentation position information with which each of the moving picture is segmented into chapters according to the extracted feature point information.

9. An information processing apparatus, comprising:

a first display control section configured to control displaying of a plurality of content representative pictures so that the content representative pictures are displayed and arranged in a first direction, the content representative pictures representing a plurality of titles of content, each of the plurality of titles of content being made up of a plurality of structural units, the titles of content being broadcast moving pictures;

a first input section configured to input a first user operation to select a content representative picture of a title of a content from the displayed content representative pictures;

a second display control section configured to control displaying of structural unit representative pictures so that the structural unit representative pictures simultaneously with the content representative pictures, the structural unit representative pictures being displayed and arranged in a single file in a second direction, a first structural unit representative picture being displayed adjacent to the selected content representative picture in the second direction when the first user operation is input and remaining structural unit representative pictures being displayed in the single file after the first structural unit representative picture, the structural unit representative pictures represent chapters of the title of content, the second direction being different from the first direction, each of the titles of content is a moving picture made up of a plurality of frames, the structural units are chapters which segment the moving picture into a plurality of regions, each of the structural unit representative pictures is a thumbnail picture of the start frame of each of the chapters, the second display control section controls displaying of the thumbnail picture of each of the chapters so that the thumbnail picture is displayed in the second direction in the time series;

a second input section configured to input a second user operation to select one structural unit representative picture of the displayed structural unit representative pictures, the reproduction control section controlling reproducing of the moving picture of the selected chapter so that the moving picture is reproduced from the start frame when the second user operation is input;

a reproduction control section configured to control reproducing of the structural unit of the title of content so that the structural unit is reproduced when the second user operation is input;

a receive section configured to receive each of the broadcast moving pictures;

a segmentation section configured to segment each of the received moving pictures into the plurality of chapters in a predetermined condition;

a record section configured to record the plurality of segmented chapters of the moving picture;

a storage section configured to store the moving picture representative pictures which represent the moving pictures and chapter representative pictures which represent the segmented chapters of each of the moving pictures; and a section configured to control the reproduction of a particular moving picture so that the reproduction of the particular moving picture is stopped; and section for storing stop position information of the particular moving picture whose reproduction has been stopped, wherein the second display control section includes:

a section configured to control displaying of a thumbnail picture of the frame at the reproduction stop position so that the thumbnail picture is displayed next to the chapter representative pictures according to the stop position information when the particular moving picture is reproduced again after its reproduction is stopped, wherein the second input section includes:

a section configured to input a fourth user operation to select a thumbnail picture of the frame at the reproduction stop position, and wherein the reproduction control section includes:

a section configured to control reproducing of the moving picture so that the moving picture is reproduced from the reproduction stop position when the fourth user operation is input.

10. A display method, comprising:

controlling displaying of a plurality of content representative pictures so that the content representative pictures are displayed and arranged in a first direction, the content representative pictures representing a plurality of titles of content, each of the plurality of titles of content being made up of a plurality of structural units;

receiving a first user operation to select a content representative picture of a title of content from the displayed content representative pictures;

receiving a second user operation to select one structural unit representative picture of the displayed structural unit representative pictures; and controlling reproducing of the structural unit of the title of content so that the structural unit is reproduced when the second user operation is received; and controlling displaying of structural unit representative pictures so that the structural unit representative pictures are displayed simultaneously with the content representative pictures, the structural unit representative pictures being arranged in a single file in a second direction, a first structural unit representative picture being displayed adjacent to the selected content representative picture in the second direction when the first user operation is input and remaining structural unit representative pictures being displayed in the single file after the first structural unit representative picture, the structural unit representative pictures representing chapters of the title of content, the second direction being different from the first direction, each of the titles of content is a moving picture made up of a plurality of frames, the structural units are chapters which segment the moving picture into a plurality of regions, each of the structural unit representative pictures is a thumbnail picture of the start frame of each of the chapters, the controlling displaying of structural unit representative pictures includes displaying of the thumbnail picture of each of the chapters so that the thumbnail picture is displayed in the second direction in the time series, the controlling reproducing includes reproducing of the moving picture of the selected chapter so that the moving picture is reproduced from the start frame when the second user operation is input, and the controlling displaying of structural unit representative pictures includes displaying of the thumbnail pictures so that the thumbnail pictures are displayed and the durations of the chapters in a total reproduction duration of the moving picture are correlated with the distances between the thumbnail pictures.

11. A non-transitory computer readable medium encoded with a program which causes an information processing apparatus to execute a method comprising:

controlling displaying of a plurality of content representative pictures so that the content representative pictures are displayed and arranged in a first direction, the content representative pictures representing a plurality of titles of content, each of the plurality of titles of content being made up of a plurality of structural units;

receiving a first user operation to select a content representative picture of a title of content from the displayed content representative pictures;

receiving a second user operation to select one structural unit representative picture of the displayed structural unit representative pictures; and controlling reproducing of the structural unit of the title of content so that the structural unit is reproduced when the second user operation is received; and controlling displaying of structural unit representative pictures so that the structural unit representative pictures are displayed simultaneously with the content representative pictures, the structural unit representative pictures being arranged in a single file in a second direction, a first structural unit representative picture being displayed adjacent to the selected content representative picture in the second direction when the first user operation is input and remaining structural unit representative pictures being displayed in the single file after the first structural unit representative picture, the structural unit representative pictures representing chapters of the title of content, the second direction being different from the first direction, each of the titles of content is a moving picture made up of a plurality of frames, the structural units are chapters which segment the moving picture into a plurality of regions, each of the structural unit representative pictures is a thumbnail picture of the start frame of each of the chapters, the controlling displaying of structural unit representative pictures includes displaying of the thumbnail picture of each of the chapters so that the thumbnail picture is displayed in the second direction in the time series, the controlling reproducing includes reproducing of the moving picture of the selected chapter so that the moving picture is reproduced from the start frame when the second user operation is input, and the controlling displaying of structural unit representative pictures includes displaying of the thumbnail pictures so that the thumbnail pictures are displayed and the durations of the chapters in a total reproduction duration of the moving picture are correlated with the distances between the thumbnail pictures.

12. The information processing apparatus as set forth in claim 1, wherein the first display control section is configured to display the contents representative pictures in a single file in the first direction.

13. The information processing apparatus as set forth in claim 1, wherein the first direction is perpendicular to the second direction.

* * * * *